United States Patent [19]

Fischer

[11] Patent Number: 4,992,010
[45] Date of Patent: Feb. 12, 1991

[54] DEVICE FOR FORMING AN UNDERCUT IN A DRILLED HOLE

[75] Inventor: Artur Fischer, Tumlingen, Fed. Rep. of Germany

[73] Assignee: fischerwerke Artur Fischer GmbH & Co KG, Waldachtal/Tumlingen, Fed. Rep. of Germany

[21] Appl. No.: 439,463

[22] Filed: Nov. 20, 1989

[30] Foreign Application Priority Data

Nov. 24, 1988 [DE] Fed. Rep. of Germany ....... 3839617

[51] Int. Cl.$^5$ ...................... B23B 29/034; B28D 1/14
[52] U.S. Cl. ........................................ 408/159; 82/1.5; 175/286; 408/180
[58] Field of Search .................. 175/284, 286; 408/81, 408/153, 159, 180; 82/1.5

[56] References Cited

U.S. PATENT DOCUMENTS 3,008,360 11/1961 Winberry, Jr. ...................... 408/159

FOREIGN PATENT DOCUMENTS

| 859849 | 10/1952 | Fed. Rep. of Germany ...... 408/159 |
| 931024 | 6/1955 | Fed. Rep. of Germany ...... 408/159 |
| 3024656 | 1/1982 | Fed. Rep. of Germany . |
| 3111362 | 4/1982 | Fed. Rep. of Germany . |
| 8411662 | 8/1988 | Fed. Rep. of Germany . |
| 1184106 | 3/1970 | United Kingdom ................ 408/159 |

Primary Examiner—Ramon S. Britts
Assistant Examiner—David J. Bagnell
Attorney, Agent, or Firm—Michael J. Striker

[57] ABSTRACT

A device for forming an undercut in a drilled hole comprises a stem having a pivotal reaming element at a lower end thereof, and a guide tube in which the stem is longitudinally displaceable with the reaming element pivoting radially outwards from the guide tube in a lower end position of the stem.

7 Claims, 2 Drawing Sheets

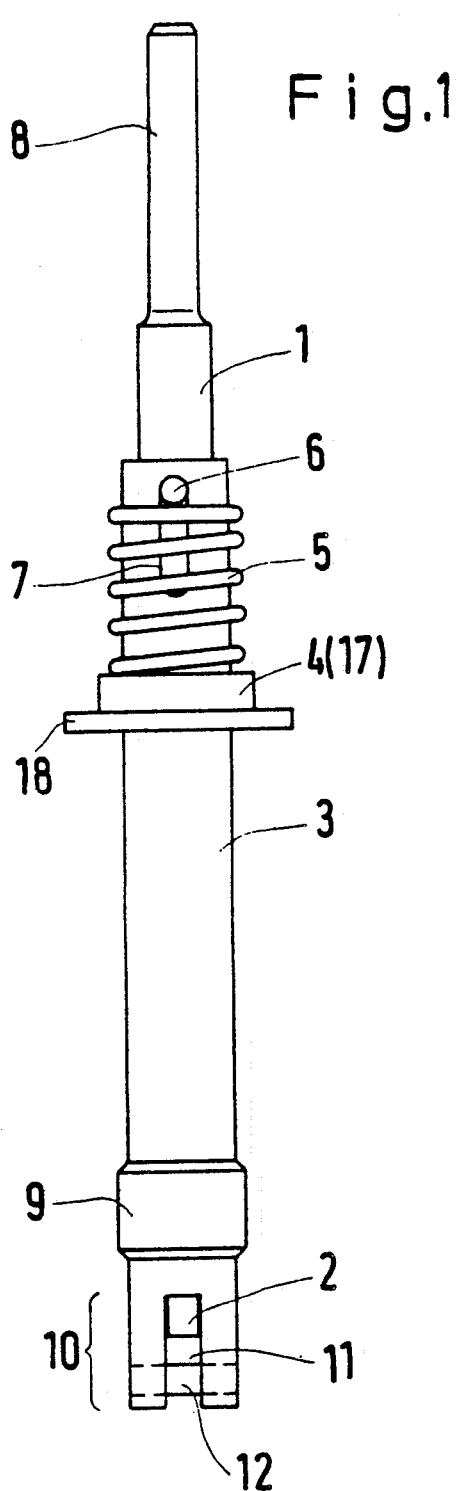
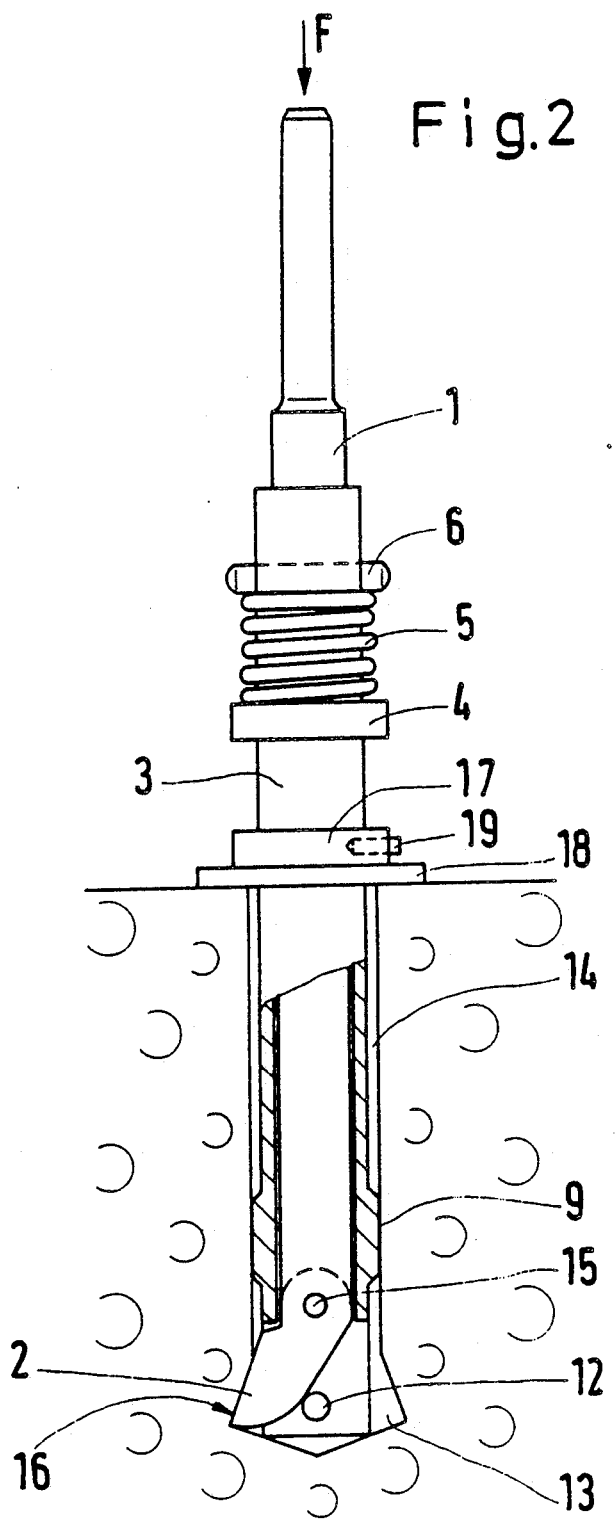
Fig.1
Fig.2

DEVICE FOR FORMING AN UNDERCUT IN A DRILLED HOLE

BACKGROUND OF THE INVENTION

The invention relates to a device for forming an undercut in a drilled hole and comprisig a stem the upper portion of which is received in a drilling machine, and the lower part of which has a cutting edge projected laterally; and a depth stop.

German Offenlegungsschrift No. 23 49 998 discloses a device for provideing drilled holes with an undercut in order to anchor fixing elements with expansible bodies therein. The expansible part of the fixing elements is able to engage in the undercut with a matching fit. Thereby in hard materials, for example in concrete masonry, an expecially reliable fixing is achieved. With the known device, the undercut is produced by swivelling the drilling device. The execution of a swivelling movement requires some practice, and special precautions are required to ensure that the formed undercuts are produced in a complete and uniform manner.

SUMMARY OF THE INVENTION

The object of the invention is to provide a device for forming an undercut without any swivelling movement of the drilling apparatus.

The object of the invention is achieved by providing a guide tube in which the stem is displaceable. The stem located in the guide, has at its front end a pivotable reaming element which, due to axial pressure on the stem, pivots radially outwards from the guide tube so that is engages the wall of the drilled hole with its lateral cutting edge and, because of its rotation, reams out an undercut.

For the reaming element, which is prefereably constructed as a pivotable plate, to receive a good lateral guidance, at its lower end, the guide tube may be formed as a longitudinally slotted rod. In the region of the longitudinal slot, the guide tube, thus, has a solid construction, with the side walls of the longitudinal slot forming the desired lateral guide for the reaming element. The transverse forces generated as the undercut is being reamed out, are thus transferred in an optimal manner to the guide tube. In addition, the drilling dust accumulating as the undercut is being formed, is able to escape unhindered at the front end of the longitudinal slot. Accordingly, several undercuts can be successively produced without problems, since clogging or other hindrance caused by the accumulating drilling dust in the region of the reaming element, is reliably avoided.

On its rear side remote from the cutting edge the reaming element may have a guide cam, which is located adjacent to a bolt extending transverse through the longitudinal slot. If the stem is pressed downwards in the guide tube, then the bolt forces the reaming element radially outwards. The pressure exerted axially on the shrank, is thus converted into a radial force component in the region of the cutting edge of the reaming element.

The guide tube may be formed with a guide collar, the outer diameter of which is matched with the diameter of the drilled hole in which an undercut is to be formed. The remaining diameter of the guide tube is slightly reduced with respect to the diameter of the drilled hole, thus facilitating the insertion of the guide tube and thus of the entire device into the drilled hole. This feature facilitates the insertion of the device particularly into curved drilled holes.

According to an advantageous embodiment of the invention, there is provided a depth stop which is vertically adjustable. This feature enables undercuts to be produced at a predetermined depth of a drilled hole while using one and the same device.

Furthermore, it is also advantageous to provide beneath the depth stop a freely rotatable hearing washer. The washer protects the mouth of the drilled hole from damage during the reaming operation.

It is furthermore especially advantageous to provide a spring force for biasing the stem to an upper end position in the guide tube. When producing the undercut, the stem is pushed by the operator into the guide tube against the spring force, the spring absorbing vibrations and shocks. Preferably, to this end a compression spring in the form of a helical spring is provided. The spring surrounds the guide tube in the upper region and is held between a support bearing constructed on the stem and a support bearing arranged on the guide tube.

The invention as to its construction so to its mode of operation, together with additional objects and advantages thereof, will be best understood from the following detailed description of the preferred embodiment with reference to appended drawings.

BRIEF DESCRIPTION OF THE DRAWING

FIG. 1 shows a side view of a device according to the invention in an unstressed state;

FIG. 2 shows a side view, turned by 90° with respect to the side view shown in FIG. 1 with the stem of the device pressed downwards.

DETAILED DESCRIPTION OF THE PREFERRED EMBODIMENT

Figure 3:
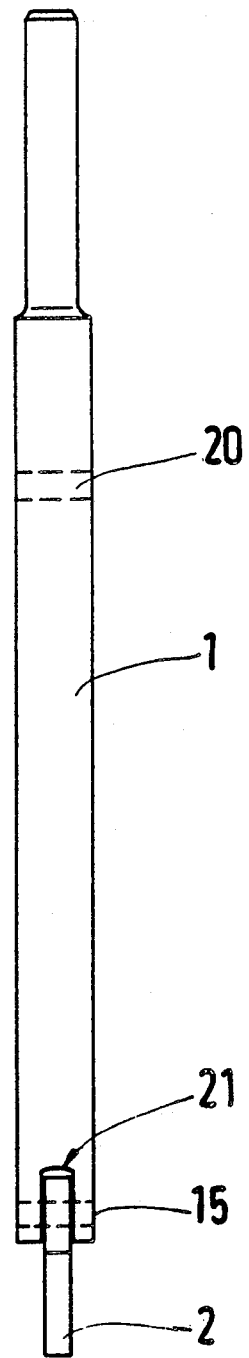
FIG. 3 shows a side view of the stem used in the devices with the reaming element illustrated in FIG. 1 and FIG. 2.

The device illustrated in FIG. 1 consists of a stem 1 with a reaming element 2. The stem extends in a guide tube 3 having an attached ring 4, which is engaged by a compression spring 5 shown in a simplified form. At the other end of the compression spring 5, a transverse pin 6 forms a support for the compression spring 5. The transverse pin 6 is guided in a slot 7 in the guide tube 3 and in FIG. 1, it is shown as being located in an upper end position.

At its upper end, the stem 1 can be clamped by its tapered end portion 8 in a drill chuck or similar part of a drilling machine.

In its lower region, the guide tube 3 has a projecting guide collar 9, the diameter of which corresponds to the diameter of the drilled hole in which an undercut is to be formed. It may be expedient to make the diameter of the guide collar 9 slightly smaller than the diameter of the drilled hole in order to ensure that the guide tube can be inserted into the drilled hole without hindrance.

The lower end of the guide tube 3 is formed by a longitudinally slotted rod portion 10. The width of the longitudinal slot 11 corresponds to the width of the reaming element 2, so that opposing side walls of the longitudinal slot 11 form guide faces for the reaming element 2. At the lower end of the longitudinal slot 11, there is provided a bolt 12 which extends transversely to the tube and which, as the shank 1 is pushed downwards, presses the reaming element 2 laterally out of the guide tube by acting on a guiding cam 16a, as shown in FIG. 2.

In FIG. 2, the stem 1 is pressed downwards with a force F, so that the reaming element 2 reams out an undercut 13 at the bottom of a drilled hole 14. During the reaming operation, the stem 1 is rotated by a drillind device, not shown. The guide tube 3 and the reaming element 2 are pivotally attached to the stem 1 and rotate with the stem. The reaming element 2 comprises a pivotable plate and is fixed with a hinge pin 15 to the lower end of the stem 1. A laterally projecting cutting edge 16 of the reaming element 2 can be fitted with a hard metal plate which forms the actual cutting edge.

The compression spring 15 is compressed in FIG. 2 by the force F. If the force F is not applied, then the compression spring 5 acts on the bolt 6 and moves the entire stem 1, upwardly to the upper end position, which is determined by the length of the slot 7. the reaming element 2 retracts at least partially into the tubular portion of the guide tube 3, and the cutting edge 16 no longer projects laterally.

The device shown in FIG. 2, is additionally provided with a vertically adjustable depth stop 17. A support washer 18 is provided beneath the bottom surface of the stop 17. The depth stop 17 can be fixed in any desired position on the guide tube 3 by a locking screw 19. In FIG. 1, the ring 4 rigidly joined to the guide tube 3, serves as a stop.

FIG. 3 shows the stem itself. It has an upper bore 20 for receiving the transverse pin 6. At the lower end, the hinge pin 15 holds the reaming element 2 which is pivotable about the axis of the hinge pin 15 in an axially aligned bearing groove 21. The stem 1 is a solid metal part. The remaining parts of the device are also made of metal.

While the invention has been illustrated and described as embodied in a device for forming an undercut in a drilled hole, it is not intended to be limited to the details shown, since various modifications and structural changes may be made without departing in any way from the spirit of the present invention.

Without further analysis, the foregoing will so fully reveal the gist of the present invention that othrs can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

I claim:

1. A device for forming an undercut in a drilled hole in masonry, comprising a stem having an upper portion to be clamped in a drilling machine and a lower portion and having upper and lower end positions; a reaming element arranged at said lower end portion of said stem and having a cutting edge; a guide tube in which said stem is displaceable between the upper and lower positions thereof, said reaming element pivoting radially outwards out of said guide tube with said cutting edge projecting laterally from said guide tube upon displacement of said stem to the lower end position thereof; and a compression spring surrounding said guide tube and biasing said stem into the upper end position thereof, said guide tube having slot means at an upper end thereof and a ring spaced from said slot means, said stem being provided with a transverse pin extending through said slot means, said compression spring extending between said transverse pin and said ring.

2. A device according to claim 1, wherein said guide tube has a lower end portion formed as a rod having a longitudinal slot having a lower open end and lateral guide surfaces for guiding said reaming element.

3. A device according to claim 2; further comprising a bolt extending transversely through said longitudinal slot, said reaming element having a rear side remote from said cutting edge, and a guide cam for engaging said bolt.

4. A device according to claim 1, wherein said cutting edge is formed of a hard metal.

5. A device according to claim 1; further comprising a depth stop, said guide tube having a projecting guide collar located between said depth stop and said reaming element.

6. A device according to claim 5, wherein said depth stop is vertically adjustable.

7. A device according to claim 5; further comprising a rotatable support washer located adjacent a side of said depth stop facing said reaming element.

* * * * *